United States Patent [19]
LaRocco et al.

[11] 3,960,066
[45] June 1, 1976

[54] BEVERAGE PREPARATION APPARATUS

[75] Inventors: Thomas C. LaRocco; Atlee M. Knorr, both of Apalachin, N.Y.

[73] Assignee: Union Kol-Flo Corporation, Vestal, N.Y.

[22] Filed: June 19, 1975

[21] Appl. No.: 588,325

[52] U.S. Cl. ............................. 99/323.2; 426/590
[51] Int. Cl.² .......................................... A23G 9/06
[58] Field of Search ................. 99/275, 323.2, 300, 99/305, 309, 357, 323.3, 323.6; 426/590

[56] References Cited
UNITED STATES PATENTS

| | | | |
|---|---|---|---|
| 2,096,522 | 10/1937 | Lambert | 99/323.2 |
| 2,371,431 | 3/1945 | DiPietro | 99/323.2 |
| 2,648,274 | 8/1953 | Bendfelt | 99/323.2 |
| 2,655,858 | 10/1953 | Hamlin | 99/323.2 |
| 3,393,631 | 7/1968 | Harrison | 99/323.2 |

Primary Examiner—Billy J. Wilhite
Assistant Examiner—Arthur O. Henderson
Attorney, Agent, or Firm—Richard G. Stephens

[57] ABSTRACT

Energy required for production of carbonated beverages is reduced and other advantages obtained by chilling water solely prior to carbonation, carbonating the chilled water at a higher than usual temperature by passing it through a filamentary metal mass in a carbon dioxide atmosphere, and blending the chilled carbonated water with syrup using two positive-displacement pumping heads driven in common through pumping strokes of adjustable length. The apparatus may be hot sanitized quickly and easily.

12 Claims, 1 Drawing Figure

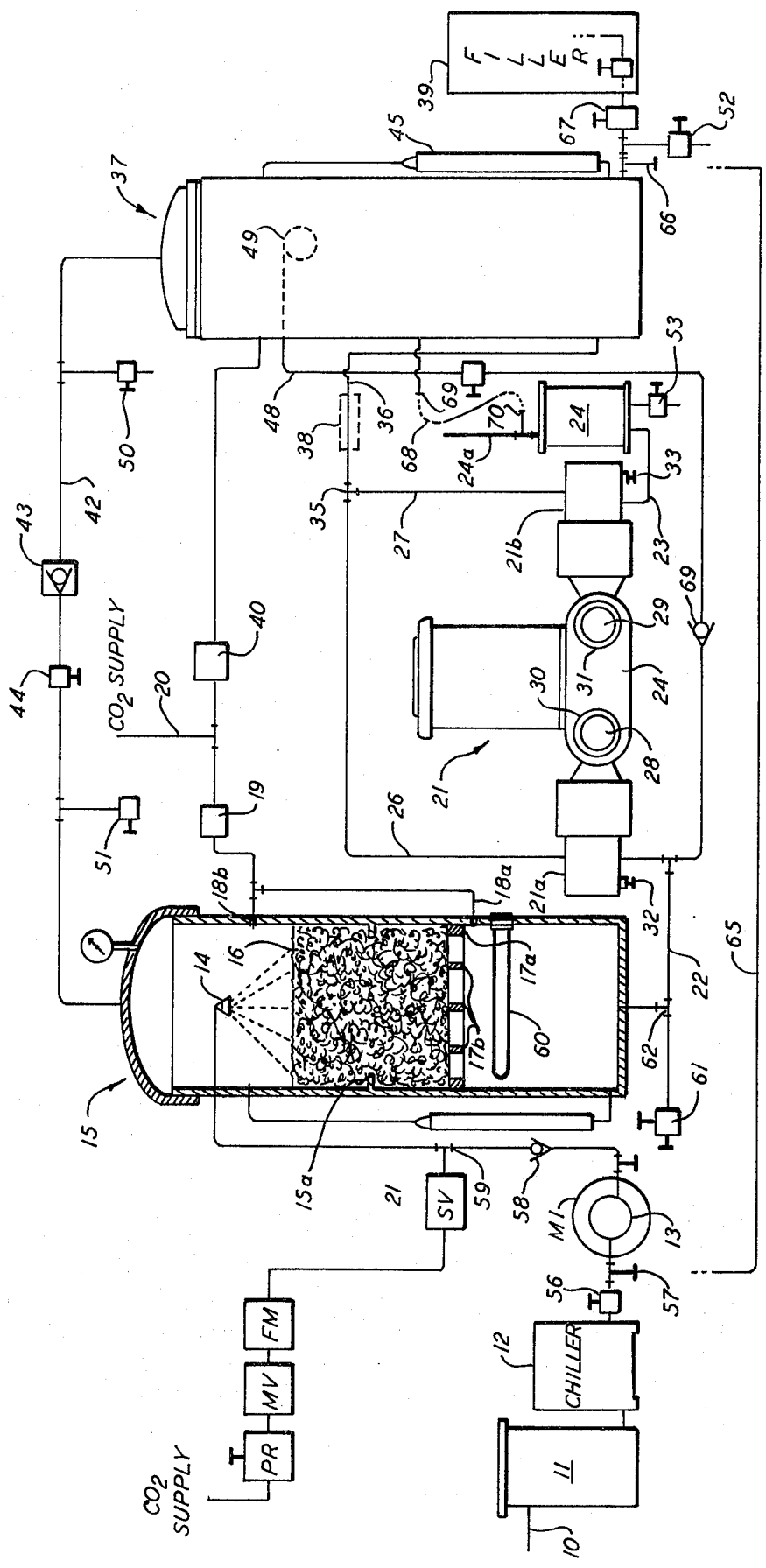

BEVERAGE PREPARATION APPARATUS

Our invention relates to beverage preparation apparatus, and more particularly, to improved apparatus useful for the preparation of carbonated beverages, such as cola drinks, for example, although it will become clear as the description proceeds that the apparatus is also useful for the preparation of non-carbonated beverages and other liquids. Apparatus of this general character is widely used, both in the United States and abroad, in numerous bottling plants. Among the objects of the present invention is that of providing an improved carbonating, proportioning and blending system which is simple and economical to construct, which is economical in its use of energy, easy to clean, and which has various other advantages which will be set forth below.

For a fuller understanding of the nature and objects of the invention reference should be had to the following detailed description taken in connection with the accompanying drawing, in which the single drawing FIGURE is a schematic diagram illustrating a preferred form of beverage preparation apparatus constructed in accordance with the present invention.

In the FIGURE a water supply line 10 supplies water (which may have been treated to remove minerals, or to provide a desired pH, in some applications) to a conventional deaerator 11 which removes air and passes deaerated water to a water-chilling system 12. The water-chilling system may comprise any one of a wide variety of conventional refrigeration systems, and is automatically controlled so that water passes from the chilling system at a predetermined temperature, preferably at approximately 38°F. The amount of chilled water may vary from say 1500 gallons per hour in a small bottling plant to say 12,000 gallons per hour in a large plant. The chilled water from cooling system 12 passes through a normally open manual shutoff valve 56 and past a normally capped tee fitting 57 to a sanitary centrifugal pump 13, which is driven by an electric motor M1. Chilled water is thus pumped by pump 13 past check valve 58 and tee 59 into saturator tank 15 near the top thereof. As will be further explained below, tee 59 is required only if certain pre-carbonation equipment shown in the drawing is desired, and will be omitted in some embodiments of the invention. The chilled water passing through check valve 58 into tank 15 is ejected downwardly inside tank 15 from spray nozzle 14. The required cooling energy represents a very significant cost in the operation of many bottling plants. The energy required to operate chiller 12 to chill the water properly obviously will depend upon the temperature at which the water arrives from a water main or well, and in some localities that temperature will vary appreciably with climate conditions. While most prior art systems require a temperature of the order of 34°F to provide effective carbonation, the apparatus of the present invention allows carbonation to occur quite as effectively at a higher than usual temperature, for reasons to be explained, so that less energy is required to operate water-chilling system 12 than that usually required to operate the refrigeration systems of the prior art. Many prior art bottling systems mix water and syrup prior to carbonation and require that syrup be chilled as well as water. Since syrup may comprise typically 15% of the total mixture, appreciable additional cooling energy is required with such systems, but not required with the present invention, because all cooling is done prior to carbonation, and carbonation is effected prior to mixing. The concept of carbonating water prior to mixing it with syrup is not per se new. Some prior systems are known in which water available at a fairly low temperature, as from a well, is first carbonated and then mixed with a syrup, with no cooling energy required. However, in many areas water is not readily available at low enough temperature to provide carbonation at acceptable production rates without the use of additional cooling. We have found that where the use of additional cooling is desired in order to achieve satisfactory carbonation at a desired production rate, the energy required for such additional cooling may be substantially decreased by refrigerating the water solely prior to carbonation, and then mixing chilled carbonated water with syrup to form the completed beverage.

One may note at this point that neither tank 15 nor any other apparatus of the system beyond water-chilling device 12 requires any refrigerant-carrying conduits or refrigeration sensors, and thus tank 15 and all succeeding portions of the system may be readily sanitized with a hot liquid without delay or damage, which is an important advantage over some prior systems.

The chilled water is directed by spray nozzle 14 in a downwardly-oriented cone-shaped spray pattern within tank 15 to evenly distribute the water over a circular area at the top of a filamentary metal (preferably stainless steel) mass 16. In one specific embodiment of the invention, tank 15 comprised a cylindrical tank having an inside diameter of 18 inches and a height of approximately 60 inches. In order that substantially all of the chilled water pass downwardly through the filamentary mass 16 and that little or no water run directly down the inside walls of the tank, nozzle 14 is arranged to distribute the cone-shaped spray over a circular area which is slightly (e.g. two inches) less in diameter than the inside diameter of the tank 15. A ring or ledge 15a may be situated between a pair of pads forming mass 16, engaging the inside wall of the tank, thereby interrupting downward flow of water which seeps through the mass to the tank wall, and redirecting that water into the metal mass. The filamentary metal mass 16 preferably comprises one or a plurality of thin metal filaments packed or woven to form one or more pads generally similar to "steel wool". In one successful embodiment of the invention the filamentary mass comprised a mesh formed by weaving twelve wound strands each approximately .005 inch in diameter, with the mesh rolled or compressed into a cylindrical shape approximately 18 inches in diameter and six inches thick, with a density or weight of approximately 26.8 pounds per cubic foot. Such a mass was used inside a tank 18 inches in inside diameter, to accommodate flow rates of the order of 2000 to 2500 gallons of water per hour.

As shown in the FIGURE, the stainless steel mass 16 is supported a substantial distance, approximately 24 inches, above the bottom of tank 15 by means of support platform, which comprises a steel band or loop 17 welded to the interior wall of the tank, with a plurality of cross strips or bars shown at 17b, 17b welded thereto, thereby supporting the stainless steel mass so as to permit downward flow of liquid without impeding upward flow of gas.

Carbon dioxide gas is admitted to saturator tank 15 at two places 18a, 18b via an adjustable pressure regulator 19 connected to a conventional bulk $CO_2$ source (not shown) via line 20, so that a large volume of carbon dioxide gas fills the tank, at pressures of approximately 25 to 60 psig. The filamentary metal mass 16 provides a very large surface area within a comparatively small volume. While the refrigerated cooling plates in typical prior art carbonation tanks provide a surface area of approximately 300 square feet in a tank having a volume of 27 cu.ft., a filamentary metal mass of the type described may provide approximately 1000 square feet of surface area within a volume of one cubic foot. The use of such a drastically increased surface area allows carbonation to proceed just as effectively at a higher temperature than that ordinarily used by the prior art if the same pressure is used, and thus the use of such a filamentary metal mass allows the use of water at a higher temperature and requires the use of less energy by water-chilling system 12. Alternatively, one could use the same temperature as that used in the prior art, and produce carbonation just as effectively as the prior art, but use less pressure in tank 15. As a further alternative, one could use the increased surface area provided by the filamentary metal mass to allow both some increase in temperature and reduction in pressure from the values which have been ordinarily used in the prior art. The use of a higher than usual temperature also saves further energy in that less heating is then required from a bottle warmer subsequently used to prevent outside condensation on filled bottles.

The interstices between the portions of the metal mass remain filled with carbon dioxide gas, and as the chilled water sprayed atop the filamentary mass filters downwardly through the mass, it becomes effectively carbonated, and thus the lower portion of the tank below the metal mass 16 carries a continuous supply of chilled carbonated water. A conventional liquid level probe system 21 connected to tank 15 senses the liquid level in the tank, and controls the operation of pump motor M1 to maintain a predetermined liquid level in tank 15. In some embodiments of the invention, an electric immersion heater 60 is installed in tank 15 below the metal mass 16 for reasons to be discussed below.

Conduit 22 leading from the bottom of tank 15 connects to a first metering head 21a of a positive-displacement metering pump assembly 21. Syrup is supplied via a conduit 23 from an accumulator 24 to a second metering head 21b of pump assembly 21. Each metering head of pump assembly 21 comprises a piston-cylinder assembly and a pair of spring-biased or gravity-operated check valves. The pistons of each head are driven in synchronism by motor M2 via a rotary-to-reciprocating motion-converting mechanism 25. The metering pump assembly 21 may comprise, for example, a Model No. NG32 pump commercially available from Bran & Lubbe, Inc., Evanston, Illinois. Motor M may comprise any one of a variety of drive motors, and typically may comprise a squirrel-cage induction motor arranged to operate at an essentially constant speed.

As the piston of water-metering head 21a moves through an intake stroke, its associated inlet check valve opens and a measured amount of chilled carbonated water is drawn into its cylinder from line 22, and then as the piston moves oppositely through a delivery stroke, the measured amount of carbonated water is expelled past its outlet check valve through conduit 26. Similarly, intake and delivery strokes of the piston of the syrup-metering head 21b draw in and expel measured amounts of syrup to conduit 27. With motor M2 driving the motion converter 24 at a constant speed, the volume of fluid which each pump head delivers during a pumping cycle depends upon the area of its piston and the length of the piston stroke. In order that the mixture ratio may be varied over a wide range, adjustment means are interposed between the motion converter and each pump head to allow adjustment of the piston stroke length in each pump head. A pair of adjustment knobs 28, 29 independently vary the stroke lengths of the two pumping heads, and the adjustments of the knobs are indicated on calibrated dials 30, 31. The rotary adjustment of each knob moves a cam by means of a screw thread to adjust the stroke length of the associated pump piston. By the use of a fine screw thread, stroke length may be accurately adjusted, and adjusted with accurate repeatability, to within a small fraction (e.g. 1/100) of a millimeter. Because the stroke lengths may be controlled with such accuracy, and because any speed variation in Motor M2 affects the two pumping heads equally, the ratio at which the two mixtures are proportioned may be controlled extremely accurately. Because ratio control can provide significant savings to the operator of a bottling plant, quality-control standards for beverages having valuable trademarks require that the brix (sugar content) fall between a pair of prescribed limits. Fluctuations in the mixture ratio which occurred in many prior systems tended to require that a ratio near the mid-point between the two limits be selected. The greater accuracy of the disclosed system allows safe operation near the lower limit, which can result in a significant reduction in the amount of syrup used.

Fluid metering by use of positive-displacement pumping heads offers much more accurate control than metering orifices, which are widely used in beverage proportioning systems. Also, metering orifices are susceptible to clogging if used with beverage components containing fruit pulp and similar solids, a problem which does not occur with the system of the present invention.

In order that the mixture ratio be precisely controlled, it is also important that neither pumping head pump air or gas. Control of the fluid level in tank 15, as well as the constant gas pressure within tank 15, insures that water-pumping head 21a will always receive a supply of carbonated water at a predetermined pressure. Accumulator 23 similarly insures a constant supply of syrup to syrup pumping head 21b. Syrup is pumped to accumulator 24 via line 24a, typically from a separate syrup supply room (not shown). In order that the two pumping heads immediately pump accurate amounts of fluid during their initial strokes of a "start-up" operation, a respective bleeder valve 32, 33 is installed on each pumping head. By temporarily opening the bleeder valves, the cylinders of the two pump heads may be relieved of air and initially filled with their respective fluids.

The separate streams of chilled carbonated water and syrup in conduits 26 and 27 are shown joined at a tee 35, where they mix or blend and are conveyed through conduit 36 into the lower portion of a balance or storage tank 37. An optional blending device may be inserted in line 36 as shown in dashed lines at 38 to insure thorough mixing of the metered components. Several forms of blending devices may be used, such as a simple length of tubing equipped with baffles. Longitudinally-extending baffles which shear the pump mixture into separate streams with minimum turbulence are preferred. Adequate mixing of the fluids will occur at tee 35, in conduit 36 and in tank 37 without the need for a specific blending device in the preparation of many beverages, and the use of a blender may be required only when one fluid component being mixed has an extremely strong concentration.

It is important to note that additional pumping heads (not shown) similar to heads 21a, 21b may be readily mounted on assembly 21, so that one or more additional liquids may be proportioned and mixed with the liquids being pumped by heads 21a and 21b.

Tank 37 is connected, through a normally-capped tee 66, a tee carrying drain valve 52, and a shutoff valve 67, to a conventional bottlefilling or can-filling machine shown as a simple block at 39. The main purposes of balance tank 37 are to provide a reservoir from which the bottlefiller may draw the mixture, and to provide a stabilizing area in which any $CO_2$ gas which was released from the mixture by the agitation or turbulence which accompanies pumping and blending may re-combine into the liquid. In order to effect such stabilization, the pressure in balance tank 37 must exceed the pressure in saturator tank 15. If the balance tank pressure were substantially below that of the saturator tank, the liquid would foam and its gas would separate out as it passed from the inlet side of the carbonated water pumping head 21a to a lower pressure on the other side. The pressure in balance tank 37 is normally maintained above that in saturator tank 15, by means of adjustable pressure regulator 40 which supplies $CO_2$ gas to tank 37. The ability to control pressure in the balance tank, and hence in the filler bowl of the bottling machine, independently of the pressure in the saturation tank 15, is a very desirable feature helpful in bottling various beverages having a tendency to foam. To prevent the pressure in tank 37 from falling below that in tank 15, an equalizing line 42 containing check valve 43 and a manually-switched electric solenoid shutoff valve 44 extends between the two tanks. During normal operation shutoff valve 44 is maintained open. If the pressure in the balance tank exceeds the pressure in the saturator tank, check valve 43 remains closed, but if balance tank pressure falls below the pressure in the saturator tank, the check valve 43 opens, allowing gas to flow to balance 37 tank to maintain the two tank pressures equal. A conventional liquid level probe system 45 connected to balance tank 37 senses the level of fluid in tank 37 and controls motor M2 to maintain a desired liquid level therein.

The system disclosed is also readily applicable to the making of non-carbonated beverages. For the production of such beverages the output conduit from pump 13 is connected to shutoff valve 61 and valve 61 is opened, so that water tends to completely by-pass tank 15 and to flow directly to pumping head 21a. However, water can flow upwardly at tee 62 below tank 15, so that tank 15 then will act as a surge tank, tending to insure a constant supply of water to pumping head 21 at a constant pressure.

In the preparation of certain beverages where increased carbonation levels are desired, pre-carbonation apparatus of the type shown in the drawing connected to tee 59 may be used. Carbon dioxide gas from the supply is connected through a conventional pressure regulator PR, a manually-controlled metering valve MV, a flowmeter FM, and an operator-controlled solenoid valve SV to tee 59. Regulator PR is ordinarily set to a pressure about 25 psi higher than the pressure in tank 15, and then metering valve MV is adjusted to provide a desired flow rate, indicated by flowmeter FM. Solenoid valve SV is opened only when such pre-carbonation is desired, of course, and it is electrically interlocked with motor M1, so that gas can pass through valve SV only while motor M1 is driving pump 13.

Typical bottling operations require occasional changes in the flavor or type of beverage being produced, and when a change to a different flavor is desired, it is necessary that all traces of the flavor theretofore being produced be flushed from the system. It is highly desirable that such flushing be accomplished as rapidly as possible, to return to production as soon as possible. With the system depicted, a substantial savings in time can be effected by flushing out the syrup lines at the same time balance tank 37 is being flushed out with carbonated water. Water may be introduced into line 24a at the syrup supply room to flow through accumulator 24, conduit 23, pumping head 21b, conduits 27 and conduit 36, thereby flushing out each of these devices and lines. Simultaneously, a shut-off valve 47 may be opened, so that carbonated water may pass from tank 15 via conduit 22, check valve 63, valve 47 and line 48 to a spray head 49 inside tank 37, thereby rinsing the walls of tank 37. Overflow valves 50 and 51 permit both tanks 15, 37 to be completely flooded with water for total elimination of air from these tanks prior to pressurizing the tanks with carbon dioxide gas, and also to allow wetting of all surfaces within these tanks during sanitizing of the tanks. In order to rinse out the system when changing from one flavor to another, valve 44 is closed, and valves 47 and 52 are opened. Water then passes from tank 15 through line 22, check valve 63, valve 47 and spray ball 49 into balance tank 37, and drains therefrom through drain valve 52. Drain valves shown at 52, 53 and 61 permit both tanks 15 and 37 and syrup accumulator 24 to be drained. Check valve 63 prevents reverse flow from tank 37 to tank 15 after a rinsing operation even if the operator should forget to close valve 47.

Beverage preparation systems require periodic sanitizing to achieve a low bacteria count. To avoid any need for rinsing and the possibility of contamination that inadequate rinsing might cause, it is usually preferred that sanitizing be done by pumping hot water through the system, at a temperature of the order of 190°F. Hot sanitizing of prior systems which incorporate refrigerated surfaces in system portions which must be sanitized has been very time-consuming, requiring that the refrigerant be pumped out before hot water is introduced, due to the very high pressure which would otherwise result from heating the refrigerant. Such systems also require a high-pressure tank for storage of the refrigerant while hot sanitizing occurs. Furthermore, high pressures can result if a valve malfunction or the like results in inadequate refrigerant removal. Also, irrespective of whether they require temporary removal of a refrigerant during sanitizing, most prior systems require auxiliary water heating and pumping equipment to accomplish hot sanitizing. In the system shown in the FIGURE, however, hot sanitizing can be accomplished rapidly and efficiently. Tanks 15 and 37 are first filled with water, and tubing indicated at 65 is connected between normally capped tees 57 and 66. Then immersion heater 60 is energized, and motor M1 is energized to run pump 13. Water then circulates from pump 13 into tank 15, through check valve 43 into tank 37, and through tubing 65 back to pump 13, being rapidly heated not only by heat from immersion heater 60, but also by the pumping energy applied to pump 13 via motor M1. If desired, a thermostat (not shown) may be used to switch heater 60 off and on as the water temperature rises above or falls below a desired sanitizing temperature. With hot water being circulated, motor M2 may be run, thereby to sanitize pump head 21a and wiper 38, and the associated lines connected thereto. Further, a length of tubing 68 may be connected between normally-capped fittings 69 and 70, thereby sanitizing syrup accumulator 24 and pump head 21b and the lines associated therewith. Simple timing devices (not shown) may be used to sanitize the system at desired temperatures for desired periods of time, and to run motor M2 at desired times during the sanitizing process. It will be seen that the complete beverage preparation system from the input pump 13 may be readily sanitized, without any need to remove any refrigerant, and without the need for auxiliary water heating equipment. Some types of container fillers may be hot sanitized, and water which has been heated and used to sanitize the beverage preparation system then may be pumped to sanitize such fillers by merely opening shutoff valve 67.

It will be understood that switch means for operating the mentioned solenoid valves, and for de-activating the level probes 21 and 45 when the tanks are to be filled, may be provided at an operator's control console (not shown), together with other apparatus which is not directly pertinent to the present invention.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrated and not in a limiting sense.

The embodiments of the invention in which an exclusive property or privilege is claimed are defined as follows:

1. Apparatus for production of carbonated beverages, comprising, in combination: water chiller means connected to receive water from a supply line and operative to provide chilled water; carbonating means connected to receive chilled water from said water-chiller means and to carbonate the chilled water without further cooling it, said carbonating means comprising a first enclosed tank containing a filamentary metal mass and means for supplying carbon dioxide gas to said tank; a syrup supply reservoir; a second enclosed tank having an inlet conduit; and pumping means for simultaneously pumping metered amounts of chilled carbonated water from said first tank and syrup from said reservoir through said inlet conduit into said second tank, said second tank being adapted to be connected to a container-filling machine.

2. The apparatus according to claim 1 having means for supplying carbon dioxide gas to said second tank; and a conduit containing a shutoff valve and a check valve interconnecting said first and second tanks, whereby when said shutoff valve is opened the pressure in said second tank will not fall below the pressure in said first tank.

3. The apparatus according to claim 1 wherein said filamentary metal mass is supported above the bottom of said first tank and said first tank is provided with a spray nozzle to spray said chilled water atop a portion of said filamentary metal mass.

4. The apparatus according to claim 1 having deflector means situated on the wall of said first tank to redirect any fluid running down an inner wall of said first tank into said filamentary metal mass.

5. The apparatus according to claim 1 wherein said pumping means comprises first and second piston-cylinder assemblies driven in synchronism by a motor through a rotary-to-reciprocating motion-converter mechanism.

6. The apparatus according to claim 1 having first conduit means connecting said first tank to said pumping means; and second conduit means connected from said first conduit means through a shutoff valve to said second tank.

7. The apparatus according to claim 1 having second pumping means for pumping chilled water from said water-chiller means to said first tank; and liquid-level sensing means connected to said first tank for controlling operation of said second pumping means.

8. The apparatus according to claim 1 having liquid-level sensing means connected to said second tank for controlling operation of said pumping means.

9. The apparatus according to claim 5 having means for individually adjusting the stroke lengths of said first and second piston-cylinder assemblies to vary the ratio of said metered amounts of chilled carbonated water and syrup.

10. Apparatus for production of carbonated beverages, comprising, in combination: a chilled water supply; a carbonation tank; first pump means having its inlet connected to said water supply to pump chilled water from said supply to said carbonation tank; a stabilizing tank adapted to be connected to a container filler and having an inlet conduit; a syrup supply reservoir; metering pump means connected to pump metered amounts of liquids from said carbonation tank and from said syrup supply reservoir to said inlet conduit of said stabilizing tank, conduit means interconnecting upper portions of said carbonation and stabilizing tank, said carbonation tank including heating means; and means for connecting said inlet of said first pump means to said stabilizing tank instead of said water supply, whereby water may be circulated through said first pump means, said carbonation tank and said stabilizing tank, and heated by operation of said first pump means and said heating means to sanitize substantially all portions of said apparatus except said chilled water supply.

11. Apparatus according to claim 10 having means for connecting said stabilizing tank to said syrup supply reservoir.

12. Apparatus according to claim 10 wherein said conduit means interconnecting upper portions of said tanks includes a check valve.

* * * * *